July 26, 1960
E. J. ZEITLIN
2,946,367
AUTOMOBILE TIRE WITH MEANS FOR ATTACHMENT
OF CHAINS, TIRE BOOT, ETC.
Filed July 10, 1957
2 Sheets-Sheet 1
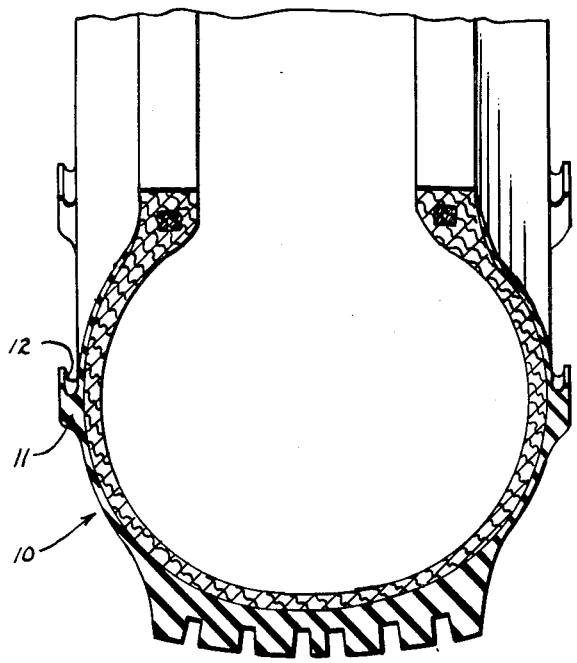
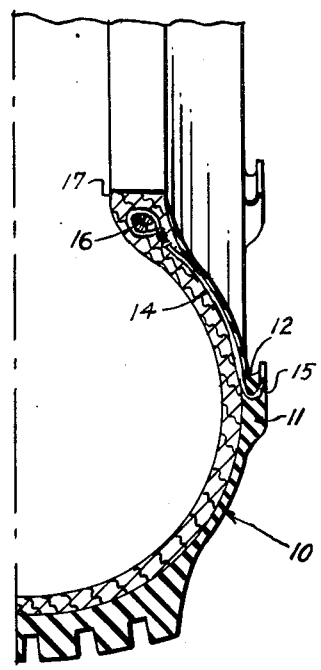
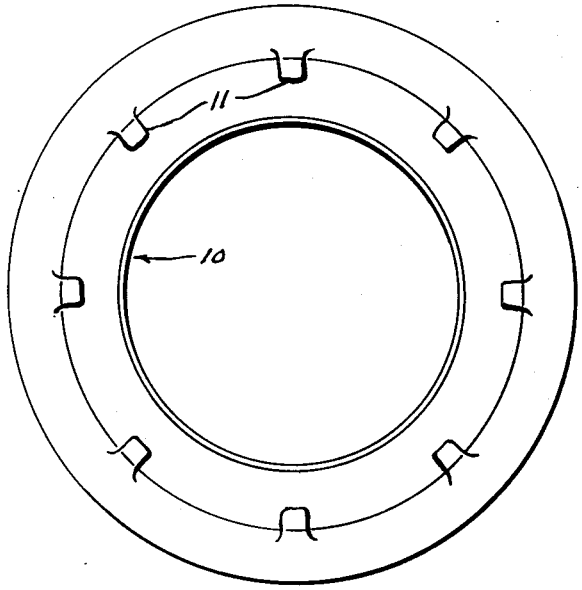
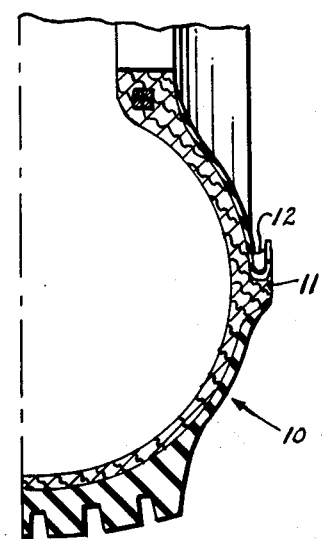
INVENTOR.
EDWARD J. ZEITLIN
BY *Howard T. Jenchan*
ATTORNEY

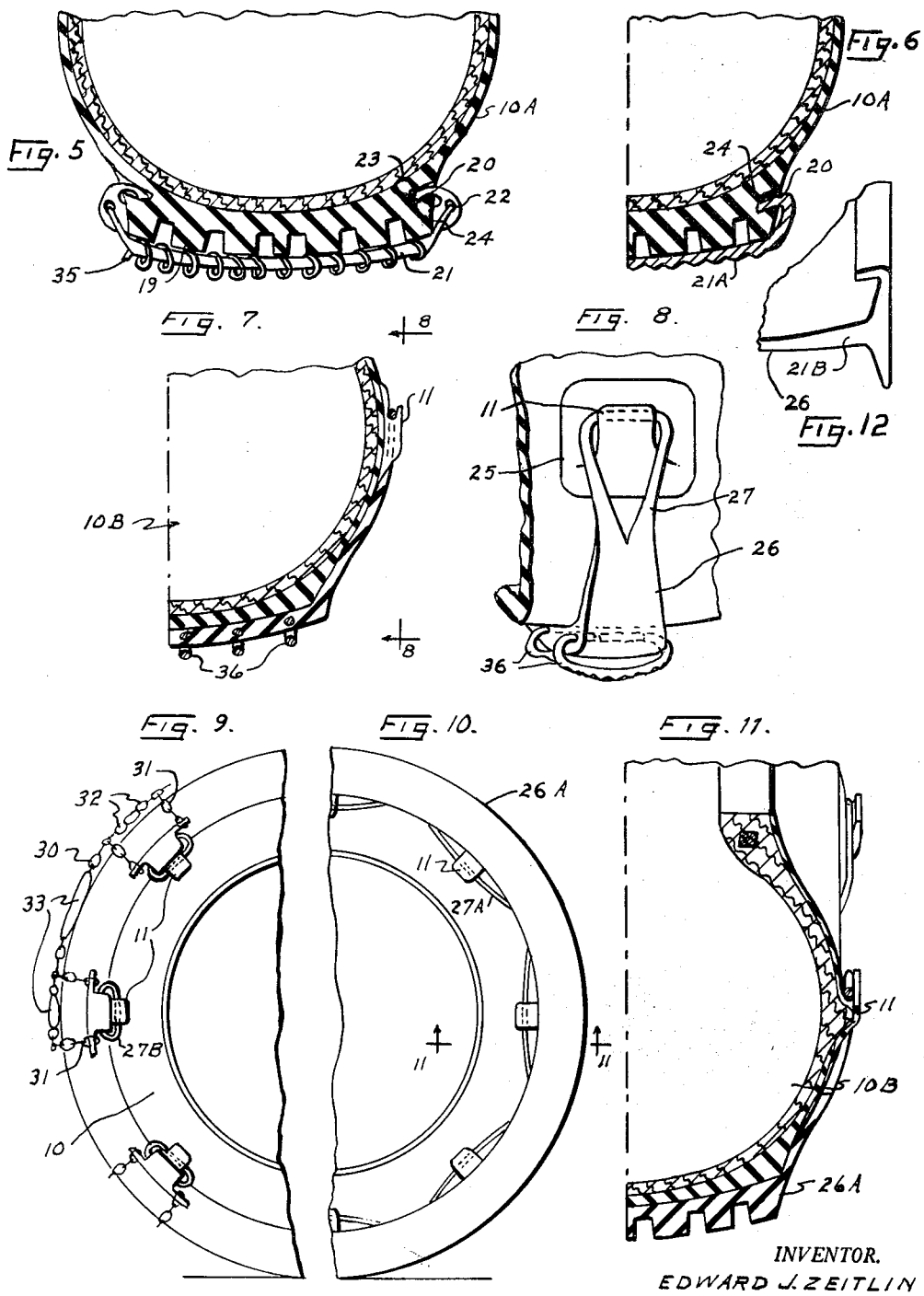

United States Patent Office 2,946,367
Patented July 26, 1960

2,946,367

AUTOMOBILE TIRE WITH MEANS FOR ATTACHMENT OF CHAINS, TIRE BOOT, ETC.

Edward J. Zeitlin, Peekskill, N.Y.
(Apple Hill, Purdy, N.Y.)

Filed July 10, 1957, Ser. No. 670,894

4 Claims. (Cl. 152—222)

This invention relates to automobile tires and more particularly to the addition of a fastening means to the walls of the tire to permit mounting chains, tire boots, etc.

An object of this invention is to provide a mounting means formed integrally with the wall of the automobile tire to permit the mounting of chains, tire boots, etc.

A further object of this invention is to provide a mounting means in the form of protruding rubber lugs formed integrally with the wall of the automobile tire to permit the mounting of chains, tire boots, etc.

A further object of this invention is to provide a mounting means in the form of protruding rubber lugs that are provided with a reinforced metal hook element in which both elements are formed integrally with the wall of the automobile tire to permit the mounting of chains, tire boots, etc.

A still further object of this invention is to provide a mounting means in the form of a protruding lug that is formed integrally with the fiber section of the tire to permit the mounting of chains, tire boots, etc.

A further object of this invention is to provide a plurality of auxiliary lugs formed of rubber and shaped to fit the wall of a tire so that said lugs may be vulcanized to said tire to become integral with to permit the mounting of chains, tire boots, etc.

A further object of this invention is to provide a plurality of pairs of grooves cut into the side walls of an automobile tire adjacent to the tread to permit mounting a chain, tire boot, etc.

Further objects of this invention shall be apparent by reference to the accompanying detailed description and the drawings in which Fig. 1 is a cross sectional view of a tire with a plurality of lugs formed integral with said tire, Fig. 2 is a partial cross sectional view of a further embodiment of this invention, Fig. 3 is a partial cross sectional view of a further embodiment of this invention, Fig. 4 is a smaller scale elevational view of a complete tire according to this invention, Fig. 5 is a partial cross sectional view of a tire showing a further embodiment of this invention, Fig. 6 is a partial cross sectional view of a tire showing a further embodiment of this invention, Fig. 7 is a partial cross sectional view of a tire with a lug vulcanized thereto, Fig. 8 is an elevational view taken on line 8—8 of Fig. 7, Fig. 9 is a partial elevational view of a tire showing a plurality of chain links attached to said tire, Fig. 10 is a partial elevational view of a tire showing an auxiliary tire boot attached thereto, Fig. 11 is a partial cross sectional view taken on line 11—11 of Fig. 10, and Fig. 12 is a further embodiment of a traction element in the form of a rail wheel.

Referring to the drawings in which there is illustrated a tire 10, in Fig. 1 the tire 10 is provided with auxiliary lugs 11 formed on each side of the tire located approximately midway on the sidewall although the exact position of the lugs may vary. In some instances it may be objectionable to have the lugs protrude beyond the periphery of the tire. In such case the lugs 11 will be moved radially inwardly to a position closer to the rim of the wheel. This position may be objectionable in other cases because of the discs that are used with a great many wheels. In such case the lugs 11 may be moved radially outwardly to a position between the outer periphery of the tire and the tread. But in any event the lug 11 is to be formed integral with the tire and is formed with a hook shaped radially inward surface 12. The number of lugs to be provided about the side wall of the tire may be varied but in most instances the equal division of the lugs similar to that illustrated in Figs. 9 and 10 will provide a satisfactory distribution for the means to be attached to the tire. The size of the lugs 11 may vary although it is presumed that the proportion will be as illustrated in Fig. 1 as long as the rubber formation is of a grade to provide a rigid element that is not easily deformed. In other words when chains or a boot is attached to the tire there is considerable strain exerted on the lugs 11 by the attaching means. The lugs 11 must be adequate to retain the mounted chain or boot without deforming and thus allowing the attached element to escape. Thus it is apparent that the size of the lug and the grade of stiffness of the rubber shall provide the necessary strength. In some instances it may be adviseable to provide a modification in this invention as illustrated in Fig. 2 in which a reinforcing element 14 in the form of an elongated metal hook is provided to be incorporated within the wall of the tire. The hook shaped end 15 is molded into the lug 11 while the upper end of element 14 is tied or wound about the wire reinforcing elements 16 in the bead 17 of the tire as illustrated in Fig. 2. A further modification is illustrated in Fig. 3 in which the lug 11 is formed mainly of a fabric composition in which the fabric is integral with the side wall fabric of the tire and as in the embodiment illustrated in Fig. 1, the formation is covered with the same rubber side wall. This embodiment provides a stronger lug than that illustrated in Fig. 1 as the fabric cannot be deformed by the pull exerted by the attached chain or boot as the case may be.

Referring to Fig. 4 there is illustrated in a somewhat smaller scale a complete tire 10 with a plurality of lugs 11 showing an equal distribution of the lugs.

Referring to Fig. 5 there is illustrated a still further embodiment of this invention. In this particular embodiment, the side wall of the tire 10A adjacent to the tread 19 is provided with a plurality of cutouts or grooves 20. Thus in this form there may be provided a chain or tread link 21. In this particular embodiment 21 is formed of an elastic stretchable material such as rubber and is attached at either end to a hook shaped element 22. Element 22 is so shaped that the hook end 23 will fit into the cutout or groove 20 and the opposite end of element 22 will abut with the side edge 24 of the tread 19. Thus with the element 21 stretched, the hook shaped elements 22 may be fastened as illustrated in Fig. 5 and the chain strap or boot 21 will be retained as illustrated providing additional traction for the tire 10A. Referring to Fig. 6 the tire 10A is similarly formed to that illustrated in Fig. 5. However in this embodiment the attaching strap or traction element 21A is not a yieldable material but rather a rigid material such as metal and the strap is formed as a single element wth the ends 24 bent and inserted into the cutouts or grooves 20. The strap 21A is thus clamped tightly to the tread as illustrated in Fig. 6. Element 21A may be treated on its surface in various ways either as a corrugated surface or as a treaded surface with a gripping material cemented thereto to provide the type of traction desired.

In a still further embodiment as illustrated in Fig. 12 element 21B may be formed as a simple metal shoe (that will completely encompass the tire) that provides an exterior surface 26 that will be similar to the surface of a train wheel thus providing a means of mounting a pneumatic tire to a rail wheel and track (not shown). Referring to Figs. 7 and 8 there is illustrated a still further embodiment of this invention in which a tire 10B is provided and in which a plurality of patches 25 are provided. The patches 25 are formed similar to the lugs 11, that is, each patch 25 has a lug 11 formed on one surface thereof. The patches 25 are formed similar to ordinary tire patches so that they may be vulcanized to the exterior wall of a tire. Thus with the patches 25 an old tire may be converted to the form illustrated in Fig. 10 with a plurality of lugs 11 affixed about the periphery to provide means for attaching a chain, tire boot, etc. Fig. 8 illustrates one form of attachment in which a tire strap 26 is provided to completely encompass the exterior of the tire from side to side and in which attaching stretchable elements 27 are formed on either end of the strap 26 to be fastened on both sides of the tire. When the strap 26 is positioned about the tire it is preferable to deflate the tire slightly the stretchable elements 27 are first aligned with each of the lugs 11 and by stretching elements 27 they may be positioned over lugs 11 to thus retain the strap 26 as illustrated. The tire may then be reinflated to its full capacity and pressure thus providing a tight gripping of the boot. Referring to Fig. 10 a partial view of the wheel is illustrated. In this particular illustration a tire boot 26A is provided and a plurality of lugs 11 either as shown in Fig. 1, Fig. 2, Fig. 3, or Figs. 7 and 8 may be utilized. The boot 26A is provided with a plurality of stretchable elements 27A and each element 27A is positioned so that it will be in alignment with a lug 11. Thus by stretching elements 27A they may be affixed over lugs 11 to retain the boot 26A as illustrated. Fig. 11 is a cross sectional view taken on Fig. 10 to illustrate how a new boot 26A may be attached to an old worn out tire 10B. As in Figs. 7 and 8 if the tire 10B is the old form, the lugs 11 may be vulcanized to tire 10B. If the tire is of the form illustrated in Figs. 1, 2 or 3 the lugs 11 will of course be integral with the tire.

Referring to Fig. 9 there is illustrated a partial elevational view of a tire 10 or 10B in which a plurality of lugs 11 are utilized to attach a stretchable or resilient chain 30 or a plurality of resilient mounted chain links 31. The chain 30 is provided with a plurality of rigid traction links 32 and a plurality of resilient stretchable elements 33. The chain links are similar to those commonly used for attachment to auto wheels of the spoke type where the chain could be wrapped about the complete wheel. However with the majority of cars now using disc wheels, this type of attachment is not possible thus instead of a strap passing from one end of the chain link to the opposite and each end of the chain link is provided with a stretchable band 27B. Thus with lugs 11 on each side of the tire, the bands 27B do provide the means of mounting chain links 31 and since elements 27B are stretchable they will retain links 31 in a tight fitting relationship as illustrated.

A still further embodiment of this invention is shown in Fig. 5 in which the tread link 21 is encompassed by a loosely formed coil spring 35. Spring 35 is replaceable and being resilient will conform to the contour of the strap 21.

Referring to Figures 7 and 8 there is a still further embodiment somewhat similar to the coil spring 35 of Figure 5 except that a plurality of individual resilient links 36 are mounted in the boot or strap 26.

Although the invention described herein has been applied specifically to an automobile tire it is apparent that this includes all pneumatic tires to provide a means of mounting either a chain, strap, tire boot, etc. Although the attaching means, lugs 11, have been described as formed integral with the tire, the lugs are also provided as auxiliary attaching elements that may be vulcanized to a tire or may be attached to a wheel, without departing from the spirit of this invention. Further although a tire chain has been mentioned, a resilient strap or the combination of both shall be included. Although a plain strap has been described, the invention shall include additional gripping means such as a coil spring or resilient loops in said strap without departing from the spirit of this invention and this invention shall be limited only by the appended claims.

What is claimed is:

1. The combination of a pneumatic tire and a tire boot which includes a plurality of separate equally spaced lugs positioned along each wall of said tire and formed integrally with the tire and a plurality of stretchable rubber fastening elements affixed along the inner edge of said boot on either side thereof, said elements spaced equally about the periphery of said boot to be in alignment with the spacing of said lugs of said tire and means to affix said boot to said tire.

2. The combination of a pneumatic tire and a plurality of resilient tire straps which includes a plurality of separate equally spaced lugs positioned along each wall of said tire and formed integrally with the tire, said tire straps provided with means to attach said strap to one lug on each side of said tire, said straps formed with a plurality of laterally spaced apertures in the portion of the strap adjacent the tread of the tire and a metal loop mounted through each aperture to form a tread surface.

3. In a tire according to claim 2, in which said metal loops are part of a continuous resilient spring shaped element.

4. A resilient tire strap which includes means at each end to affix to either side of a tire and a central tread portion, said strap formed with a plurality of laterally spaced apertures in the tread portion of the strap, a metal loop mounted through each aperture to form a tread surface.

References Cited in the file of this patent

UNITED STATES PATENTS

| 1,223,724 | Otto | Apr. 24, 1917 |
| 1,268,258 | Manuel | June 1, 1918 |
| 1,491,864 | Johnson | Apr. 29, 1924 |
| 2,017,891 | Briggs | Oct. 22, 1935 |
| 2,078,764 | Kielmansegg | Apr. 27, 1937 |
| 2,467,251 | Bowman | Apr. 12, 1949 |
| 2,552,995 | Morrone | May 15, 1951 |
| 2,589,207 | Welsh | Mar. 11, 1952 |

FOREIGN PATENTS

| 105,961 | Sweden | Nov. 17, 1942 |
| 200,665 | Australia | Jan. 10, 1956 |